(12) United States Patent
Landberger

(10) Patent No.: US 12,556,926 B2
(45) Date of Patent: Feb. 17, 2026

(54) DEVICES AND METHODS FOR SECURING COMMUNICATION BETWEEN A SENSOR AND A DEVICE

(71) Applicant: Dometic Sweden AB, Solna (SE)

(72) Inventor: Ulf Landberger, Spanga (SE)

(73) Assignee: Dometic Sweden AB, Solna (SE)

( * ) Notice: Subject to any disclaimer, the term of this patent is extended or adjusted under 35 U.S.C. 154(b) by 137 days.

(21) Appl. No.: 18/245,322

(22) PCT Filed: Sep. 15, 2021

(86) PCT No.: PCT/EP2021/075391
§ 371 (c)(1),
(2) Date: Mar. 14, 2023

(87) PCT Pub. No.: WO2022/058391
PCT Pub. Date: Mar. 24, 2022

(65) Prior Publication Data
US 2023/0362649 A1    Nov. 9, 2023

(30) Foreign Application Priority Data

Sep. 18, 2020   (EP) .................................. 20197023

(51) Int. Cl.
*H04W 12/106*    (2021.01)
*H04W 12/00*     (2021.01)
*H04W 12/041*    (2021.01)
(52) U.S. Cl.
CPC ....... *H04W 12/106* (2021.01); *H04W 12/041* (2021.01); *H04W 12/009* (2019.01)

(58) Field of Classification Search
CPC ............. H04W 12/106; H04W 12/041; H04W 12/009; H04L 2209/805; H04L 9/0866; H04L 9/3242; H04L 63/123
See application file for complete search history.

(56) References Cited

U.S. PATENT DOCUMENTS

| 4,916,909 A | 4/1990 | Mathur et al. |
| 5,424,720 A | 6/1995 | Kirkpatrick |

(Continued)

FOREIGN PATENT DOCUMENTS

| AT | 263982 T | 4/2004 |
| AT | 439486 T | 8/2009 |

(Continued)

OTHER PUBLICATIONS

US D887,373 S, 06/2020, Becker (withdrawn)
(Continued)

*Primary Examiner* — Mohammed Waliullah
(74) *Attorney, Agent, or Firm* — Dinsmore & Shohl LLP

(57) ABSTRACT

The present disclosure relates to a method, implemented by a sensor e.g. being used in a Recreational Vehicle monitoring and control system, for securing communication between the sensor and a device which is separate and distinct from the sensor. The method comprises receiving, from a control device, an identifier of the sensor and a request for an address of the sensor and a key for the sensor. The identifier of the sensor is to be related to the address and the key for the sensor. The method further comprises generating the key for the sensor. The generated key is to be used for verifying data integrity of sensor data transmitted from the sensor. Thereafter, the method comprises transmitting, to the control device, a message comprising the address and the generated key for the sensor.

3 Claims, 5 Drawing Sheets

(56) References Cited

U.S. PATENT DOCUMENTS

| | | | |
|---|---|---|---|
| 5,632,614 A | 5/1997 | Consadori et al. | |
| D397,909 S | 9/1998 | Ashcraft et al. | |
| 5,931,151 A | 8/1999 | Van Dore et al. | |
| 6,134,906 A | 10/2000 | Eastman | |
| 6,259,227 B1 | 7/2001 | Gherman et al. | |
| 6,460,356 B1 | 10/2002 | Tao et al. | |
| 6,591,622 B1 | 7/2003 | Gherman et al. | |
| 6,729,144 B1 | 5/2004 | Kupferman | |
| 6,856,820 B1 | 2/2005 | Kolls | |
| 6,863,222 B2 | 3/2005 | Slifkin et al. | |
| 6,929,061 B2 | 8/2005 | Lajeunesse | |
| 7,082,380 B2 | 7/2006 | Wiebe et al. | |
| 7,117,051 B2 | 10/2006 | Landry et al. | |
| 7,131,282 B2 | 11/2006 | Karlsson et al. | |
| 7,412,837 B2 | 8/2008 | Karisson et al. | |
| 7,423,392 B2 | 9/2008 | Gill | |
| 7,448,546 B2 | 11/2008 | Jung et al. | |
| D588,479 S | 3/2009 | Giese | |
| D604,305 S | 11/2009 | Anzures et al. | |
| 7,707,845 B2 | 5/2010 | Bilodeau | |
| 7,739,882 B2 | 6/2010 | Evans et al. | |
| 7,849,699 B2 | 12/2010 | Allen | |
| 8,307,667 B2 | 11/2012 | Rusignuolo et al. | |
| 8,374,824 B2 | 2/2013 | Schwiers et al. | |
| 8,461,958 B2 | 6/2013 | Saenz et al. | |
| 8,539,783 B1 | 9/2013 | Bunch | |
| 8,545,113 B2 | 10/2013 | Johnson et al. | |
| 8,549,131 B2 | 10/2013 | Keyghobad et al. | |
| 8,653,949 B2 | 2/2014 | Lee et al. | |
| 8,960,563 B1 | 2/2015 | Perten et al. | |
| 8,981,930 B2 | 3/2015 | Horstemeyer et al. | |
| D738,355 S | 9/2015 | Smith et al. | |
| 9,143,402 B2 * | 9/2015 | Tinnakornsrisuphap | H04W 12/06 |
| 9,193,312 B2 | 11/2015 | Colella et al. | |
| D756,333 S | 5/2016 | Smith et al. | |
| D757,691 S | 5/2016 | Smith et al. | |
| D761,232 S | 7/2016 | Smith et al. | |
| D766,217 S | 9/2016 | Smith et al. | |
| 9,454,897 B2 | 9/2016 | Cattermole et al. | |
| 9,644,969 B2 * | 5/2017 | Koenig | B60K 35/26 |
| D795,712 S | 8/2017 | Bergin et al. | |
| D823,265 S | 7/2018 | Meda et al. | |
| D834,961 S | 12/2018 | Bergin et al. | |
| D839,318 S | 1/2019 | Meda et al. | |
| D846,505 S | 4/2019 | Becker | |
| D865,914 S | 11/2019 | Snyder | |
| 10,675,941 B2 | 6/2020 | Williamson et al. | |
| 10,696,129 B2 | 6/2020 | Berger | |
| D893,436 S | 8/2020 | Becker | |
| 10,941,955 B2 | 3/2021 | Heral | |
| 11,239,774 B2 | 2/2022 | Becker | |
| 11,254,183 B2 | 2/2022 | Peter et al. | |
| D947,699 S | 4/2022 | Schuh et al. | |
| 2003/0070444 A1 | 4/2003 | Volker et al. | |
| 2003/0164754 A1 | 9/2003 | Roseen | |
| 2004/0178889 A1 | 9/2004 | Buckingham et al. | |
| 2005/0141154 A1 | 6/2005 | Consadori et al. | |
| 2006/0123807 A1 | 6/2006 | Sullivan et al. | |
| 2007/0023180 A1 | 2/2007 | Komarek et al. | |
| 2007/0028635 A1 | 2/2007 | Gleeson | |
| 2008/0087663 A1 | 4/2008 | Mansbery et al. | |
| 2008/0115513 A1 | 5/2008 | Unmack | |
| 2008/0121729 A1 | 5/2008 | Gray | |
| 2008/0299961 A1 | 12/2008 | Muller et al. | |
| 2009/0109004 A1 | 4/2009 | Van Alstyne | |
| 2009/0139246 A1 | 6/2009 | Lifson et al. | |
| 2010/0274604 A1 | 10/2010 | Crilly | |
| 2012/0255317 A1 | 10/2012 | Leistner et al. | |
| 2014/0148975 A1 | 5/2014 | Self et al. | |
| 2014/0210593 A1 | 7/2014 | Cattermole et al. | |
| 2014/0313055 A1 | 10/2014 | Warkentin et al. | |
| 2015/0184442 A1 | 7/2015 | Gantman et al. | |
| 2015/0198937 A1 | 7/2015 | Wait | |
| 2016/0144764 A1 | 5/2016 | Dutta et al. | |
| 2016/0211985 A1 | 7/2016 | Castillo et al. | |
| 2016/0214621 A1 | 7/2016 | Baalu et al. | |
| 2017/0264224 A1 | 9/2017 | Becker | |
| 2017/0372600 A1 | 12/2017 | Palin et al. | |
| 2018/0134116 A1 | 5/2018 | Chen et al. | |
| 2018/0147913 A1 | 5/2018 | Bergin | |
| 2018/0191687 A1 * | 7/2018 | Munafo | G06F 21/602 |
| 2019/0003765 A1 | 1/2019 | Chen et al. | |
| 2019/0128551 A1 * | 5/2019 | Heral | H04L 67/565 |
| 2019/0199520 A1 * | 6/2019 | Kim | H04L 9/0866 |
| 2020/0217575 A1 | 7/2020 | Thelin et al. | |
| 2020/0298655 A1 | 9/2020 | Williamson et al. | |
| 2020/0313871 A1 | 10/2020 | Troia et al. | |
| 2020/0338951 A1 | 10/2020 | Paci et al. | |
| 2021/0142601 A1 | 5/2021 | Schoenfelder et al. | |
| 2021/0229529 A1 | 7/2021 | Cai et al. | |
| 2021/0323420 A1 * | 10/2021 | Lu | H04L 63/123 |
| 2022/0114847 A1 | 4/2022 | Emde et al. | |
| 2022/0114853 A1 | 4/2022 | Emde et al. | |
| 2022/0148352 A1 | 5/2022 | Schuh | |
| 2022/0410828 A1 | 12/2022 | Schuh et al. | |

FOREIGN PATENT DOCUMENTS

| | | |
|---|---|---|
| AT | 483596 T | 10/2010 |
| AT | 504462 T | 4/2011 |
| AU | 2001280374 A1 | 5/2002 |
| AU | 2003217095 A1 | 9/2003 |
| AU | 2007200788 A1 | 9/2007 |
| AU | 2002335708 B2 | 4/2008 |
| AU | 2006259965 B2 | 6/2009 |
| AU | 2005239637 B2 | 12/2010 |
| AU | 2014246608 A1 | 3/2016 |
| AU | 1087016 S | 4/2016 |
| AU | 1175116 S | 5/2016 |
| AU | 201710975 S | 3/2017 |
| AU | 201710976 S | 3/2017 |
| AU | 1280417 S | 5/2017 |
| AU | 201712767 S | 5/2017 |
| AU | 201811509 S | 4/2018 |
| AU | 201811512 S | 4/2018 |
| AU | 2019284128 A1 | 7/2020 |
| AU | 2017364256 B2 | 2/2022 |
| AU | 2017222698 B2 | 6/2022 |
| AU | 2021343247 A1 | 3/2023 |
| CA | 2572005 A1 | 8/2007 |
| CA | 2578651 A1 | 8/2007 |
| CA | 2528368 C | 3/2011 |
| CA | 167369 S | 12/2016 |
| CA | 170638 S | 12/2016 |
| CA | 2948710 A1 | 9/2017 |
| CA | 174706 S | 5/2018 |
| CA | 179312 S | 5/2018 |
| CN | 2420532 Y | 2/2001 |
| CN | 1299034 A | 6/2001 |
| CN | 2434623 Y | 6/2001 |
| CN | 2524157 Y | 12/2002 |
| CN | 1116579 C | 7/2003 |
| CN | 1475763 A | 2/2004 |
| CN | 1178037 C | 12/2004 |
| CN | 1570929 A | 1/2005 |
| CN | 1761318 A | 4/2006 |
| CN | 1763450 A | 4/2006 |
| CN | 2769742 Y | 4/2006 |
| CN | 2780132 Y | 5/2006 |
| CN | 2811877 Y | 8/2006 |
| CN | 1828186 A | 9/2006 |
| CN | 2829654 Y | 10/2006 |
| CN | 2849539 Y | 12/2006 |
| CN | 1888750 A | 1/2007 |
| CN | 1936533 A | 3/2007 |
| CN | 2878997 Y | 3/2007 |
| CN | 2906406 Y | 5/2007 |
| CN | 101063586 A | 10/2007 |
| CN | 200961918 Y | 10/2007 |
| CN | 101074816 A | 11/2007 |
| CN | 201000370 Y | 1/2008 |
| CN | 201015999 Y | 2/2008 |
| CN | 201028884 Y | 2/2008 |

(56) References Cited

FOREIGN PATENT DOCUMENTS

| | | | |
|---|---|---|---|
| CN | 100373116 C | 3/2008 |
| CN | 100380075 C | 4/2008 |
| CN | 101153758 A | 4/2008 |
| CN | 201066217 Y | 5/2008 |
| CN | 100397004 C | 6/2008 |
| CN | 100398956 C | 7/2008 |
| CN | 101245936 A | 8/2008 |
| CN | 101245957 A | 8/2008 |
| CN | 100417880 C | 9/2008 |
| CN | 101266069 A | 9/2008 |
| CN | 201129824 Y | 10/2008 |
| CN | 201129825 Y | 10/2008 |
| CN | 201149349 Y | 11/2008 |
| CN | 201163244 Y | 12/2008 |
| CN | 201166753 Y | 12/2008 |
| CN | 201170678 Y | 12/2008 |
| CN | 101368771 A | 2/2009 |
| CN | 201191043 Y | 2/2009 |
| CN | 201196458 Y | 2/2009 |
| CN | 201209986 Y | 3/2009 |
| CN | 201230319 Y | 4/2009 |
| CN | 101435604 A | 5/2009 |
| CN | 201233076 Y | 5/2009 |
| CN | 201237396 Y | 5/2009 |
| CN | 101476563 A | 7/2009 |
| CN | 101498933 A | 8/2009 |
| CN | 201297694 Y | 8/2009 |
| CN | 201306900 Y | 9/2009 |
| CN | 201348340 Y | 11/2009 |
| CN | 201348413 Y | 11/2009 |
| CN | 100575078 C | 12/2009 |
| CN | 201363279 Y | 12/2009 |
| CN | 201363838 Y | 12/2009 |
| CN | 201363859 Y | 12/2009 |
| CN | 201363949 Y | 12/2009 |
| CN | 101665037 A | 3/2010 |
| CN | 101691863 A | 4/2010 |
| CN | 201486856 U | 5/2010 |
| CN | 201503133 U | 6/2010 |
| CN | 201539404 U | 8/2010 |
| CN | 201541754 U | 8/2010 |
| CN | 201546958 U | 8/2010 |
| CN | 201575541 U | 9/2010 |
| CN | 201589475 U | 9/2010 |
| CN | 1928445 B | 10/2010 |
| CN | 101251290 B | 10/2010 |
| CN | 101866173 A | 10/2010 |
| CN | 101363640 B | 11/2010 |
| CN | 201621800 U | 11/2010 |
| CN | 201622078 U | 11/2010 |
| CN | 201666251 U | 12/2010 |
| CN | 201672642 U | 12/2010 |
| CN | 201748559 U | 2/2011 |
| CN | 201749468 U | 2/2011 |
| CN | 101435616 B | 4/2011 |
| CN | 101464032 B | 4/2011 |
| CN | 102012146 A | 4/2011 |
| CN | 201820291 U | 5/2011 |
| CN | 101619882 B | 6/2011 |
| CN | 201849367 U | 6/2011 |
| CN | 201852224 U | 6/2011 |
| CN | 102118435 A | 7/2011 |
| CN | 201908838 U | 7/2011 |
| CN | 101586562 B | 8/2011 |
| CN | 102147125 A | 8/2011 |
| CN | 102151092 A | 8/2011 |
| CN | 102156466 A | 8/2011 |
| CN | 201923534 U | 8/2011 |
| CN | 201948819 U | 8/2011 |
| CN | 101435617 B | 9/2011 |
| CN | 102192569 A | 9/2011 |
| CN | 201964703 U | 9/2011 |
| CN | 201976127 U | 9/2011 |
| CN | 201982375 U | 9/2011 |
| CN | 102213518 A | 10/2011 |
| CN | 102235717 A | 11/2011 |
| CN | 102252369 A | 11/2011 |
| CN | 202050251 U | 11/2011 |
| CN | 202083072 U | 12/2011 |
| CN | 102338428 A | 2/2012 |
| CN | 102345951 A | 2/2012 |
| CN | 102355628 A | 2/2012 |
| CN | 102364319 A | 2/2012 |
| CN | 202177186 U | 3/2012 |
| CN | 101556069 B | 4/2012 |
| CN | 202186048 U | 4/2012 |
| CN | 101443719 B | 5/2012 |
| CN | 102444957 A | 5/2012 |
| CN | 102466296 A | 5/2012 |
| CN | 102478335 A | 5/2012 |
| CN | 101275800 B | 6/2012 |
| CN | 101788172 B | 7/2012 |
| CN | 101825087 B | 7/2012 |
| CN | 101846381 B | 7/2012 |
| CN | 101886852 B | 7/2012 |
| CN | 102042724 B | 7/2012 |
| CN | 102536819 A | 7/2012 |
| CN | 102564052 A | 7/2012 |
| CN | 102588285 A | 7/2012 |
| CN | 202287095 U | 7/2012 |
| CN | 202305190 U | 7/2012 |
| CN | 102032643 B | 8/2012 |
| CN | 102620517 A | 8/2012 |
| CN | 102650479 A | 8/2012 |
| CN | 101988839 B | 9/2012 |
| CN | 102679490 A | 9/2012 |
| CN | 102691660 A | 9/2012 |
| CN | 202431521 U | 9/2012 |
| CN | 202431522 U | 9/2012 |
| CN | 202442411 U | 9/2012 |
| CN | 202452784 U | 9/2012 |
| CN | 102705237 A | 10/2012 |
| CN | 202470336 U | 10/2012 |
| CN | 202475495 U | 10/2012 |
| CN | 202476017 U | 10/2012 |
| CN | 202501706 U | 10/2012 |
| CN | 202503538 U | 10/2012 |
| CN | 202511560 U | 10/2012 |
| CN | 101988717 B | 11/2012 |
| CN | 102765563 B | 11/2012 |
| CN | 202532335 U | 11/2012 |
| CN | 202563323 U | 11/2012 |
| CN | 102809202 B | 12/2012 |
| CN | 102840716 A | 12/2012 |
| CN | 202568984 U | 12/2012 |
| CN | 202581676 U | 12/2012 |
| CN | 202598971 U | 12/2012 |
| CN | 202613597 U | 12/2012 |
| CN | 202613835 U | 12/2012 |
| CN | 202630282 U | 12/2012 |
| CN | 102853624 A | 1/2013 |
| CN | 102878663 A | 1/2013 |
| CN | 102889748 A | 1/2013 |
| CN | 202648236 U | 1/2013 |
| CN | 202692596 U | 1/2013 |
| CN | 202708102 U | 1/2013 |
| CN | 202709553 U | 1/2013 |
| CN | 102914102 A | 2/2013 |
| CN | 202734071 U | 2/2013 |
| CN | 202734420 U | 2/2013 |
| CN | 202789544 U | 3/2013 |
| CN | 202835631 U | 3/2013 |
| CN | 102116515 B | 4/2013 |
| CN | 103032933 A | 4/2013 |
| CN | 202851355 U | 4/2013 |
| CN | 202868893 U | 4/2013 |
| CN | 202868894 U | 4/2013 |
| CN | 202868919 U | 4/2013 |
| CN | 202868920 U | 4/2013 |
| CN | 103105204 A | 5/2013 |
| CN | 202916629 U | 5/2013 |
| CN | 203771639 U | 5/2013 |
| CN | 103162469 A | 6/2013 |
| CN | 103177339 A | 6/2013 |

(56) References Cited

FOREIGN PATENT DOCUMENTS

| | | |
|---|---|---|
| CN | 202967270 U | 6/2013 |
| CN | 202993659 U | 6/2013 |
| CN | 202993694 U | 6/2013 |
| CN | 103188655 A | 7/2013 |
| CN | 103196274 A | 7/2013 |
| CN | 203053481 U | 7/2013 |
| CN | 203068889 U | 7/2013 |
| CN | 103245007 A | 8/2013 |
| CN | 103245031 A | 8/2013 |
| CN | 103245033 A | 8/2013 |
| CN | 203116393 U | 8/2013 |
| CN | 203163367 U | 8/2013 |
| CN | 203164715 U | 8/2013 |
| CN | 103292572 A | 9/2013 |
| CN | 103322766 A | 9/2013 |
| CN | 203203288 U | 9/2013 |
| CN | 203203289 U | 9/2013 |
| CN | 203203317 U | 9/2013 |
| CN | 103335485 A | 10/2013 |
| CN | 103375870 A | 10/2013 |
| CN | 103375871 A | 10/2013 |
| CN | 103375935 A | 10/2013 |
| CN | 203310199 U | 11/2013 |
| CN | 103471297 A | 12/2013 |
| CN | 203324857 U | 12/2013 |
| CN | 203366082 U | 12/2013 |
| CN | 103512087 A | 1/2014 |
| CN | 103528142 A | 1/2014 |
| CN | 103574771 A | 2/2014 |
| CN | 103574772 A | 2/2014 |
| CN | 103578257 A | 2/2014 |
| CN | 103604272 A | 2/2014 |
| CN | 103616863 A | 3/2014 |
| CN | 103629740 A | 3/2014 |
| CN | 103629866 A | 3/2014 |
| CN | 103671119 A | 3/2014 |
| CN | 203489530 U | 3/2014 |
| CN | 103691835 A | 4/2014 |
| CN | 103745359 A | 4/2014 |
| CN | 203518373 U | 4/2014 |
| CN | 203550232 U | 4/2014 |
| CN | 203550407 U | 4/2014 |
| CN | 203561118 U | 4/2014 |
| CN | 203566105 U | 4/2014 |
| CN | 102705939 B | 5/2014 |
| CN | 103776090 A | 5/2014 |
| CN | 103776212 A | 5/2014 |
| CN | 103791684 A | 5/2014 |
| CN | 103807987 A | 5/2014 |
| CN | 103808012 A | 5/2014 |
| CN | 203586483 U | 5/2014 |
| CN | 203586488 U | 5/2014 |
| CN | 103836761 A | 6/2014 |
| CN | 103854344 A | 6/2014 |
| CN | 103884152 A | 6/2014 |
| CN | 203633039 U | 6/2014 |
| CN | 203664542 U | 6/2014 |
| CN | 103906529 A | 7/2014 |
| CN | 103925677 A | 7/2014 |
| CN | 103925678 A | 7/2014 |
| CN | 103925682 A | 7/2014 |
| CN | 103925753 A | 7/2014 |
| CN | 103925755 A | 7/2014 |
| CN | 103940053 A | 7/2014 |
| CN | 103940139 A | 7/2014 |
| CN | 103940157 A | 7/2014 |
| CN | 103954082 A | 7/2014 |
| CN | 103954087 A | 7/2014 |
| CN | 203706293 U | 7/2014 |
| CN | 203719239 U | 7/2014 |
| CN | 103968620 A | 8/2014 |
| CN | 103968631 A | 8/2014 |
| CN | 103968636 A | 8/2014 |
| CN | 103968963 A | 8/2014 |
| CN | 104006445 A | 8/2014 |
| CN | 104006597 A | 8/2014 |
| CN | 203796564 U | 8/2014 |
| CN | 104033996 A | 9/2014 |
| CN | 104048406 A | 9/2014 |
| CN | 104048448 A | 9/2014 |
| CN | 104050784 A | 9/2014 |
| CN | 203833232 U | 9/2014 |
| CN | 203837349 U | 9/2014 |
| CN | 203837396 U | 9/2014 |
| CN | 104089378 A | 10/2014 |
| CN | 104101124 A | 10/2014 |
| CN | 104101125 A | 10/2014 |
| CN | 104110740 A | 10/2014 |
| CN | 104121174 A | 10/2014 |
| CN | 104122463 A | 10/2014 |
| CN | 203867902 U | 10/2014 |
| CN | 203908094 U | 10/2014 |
| CN | 203908147 U | 10/2014 |
| CN | 203908786 U | 10/2014 |
| CN | 102958751 B | 11/2014 |
| CN | 104134292 A | 11/2014 |
| CN | 104139226 A | 11/2014 |
| CN | 104142001 A | 11/2014 |
| CN | 104154802 A | 11/2014 |
| CN | 104155964 A | 11/2014 |
| CN | 104165443 A | 11/2014 |
| CN | 104165483 A | 11/2014 |
| CN | 203928142 U | 11/2014 |
| CN | 203964436 U | 11/2014 |
| CN | 203964468 U | 11/2014 |
| CN | 203965900 U | 11/2014 |
| CN | 104180442 A | 12/2014 |
| CN | 104197632 A | 12/2014 |
| CN | 104199358 A | 12/2014 |
| CN | 104214887 A | 12/2014 |
| CN | 104215007 A | 12/2014 |
| CN | 104219289 A | 12/2014 |
| CN | 104236023 A | 12/2014 |
| CN | 104236198 A | 12/2014 |
| CN | 104236244 A | 12/2014 |
| CN | 104251591 A | 12/2014 |
| CN | 204006509 U | 12/2014 |
| CN | 204029050 U | 12/2014 |
| CN | 204044653 U | 12/2014 |
| CN | 204055526 U | 12/2014 |
| CN | 204063308 U | 12/2014 |
| CN | 204063678 U | 12/2014 |
| CN | 104266318 A | 1/2015 |
| CN | 104266423 A | 1/2015 |
| CN | 104279150 A | 1/2015 |
| CN | 104279716 A | 1/2015 |
| CN | 104279836 A | 1/2015 |
| CN | 104289021 A | 1/2015 |
| CN | 104296348 A | 1/2015 |
| CN | 104296489 A | 1/2015 |
| CN | 104315671 A | 1/2015 |
| CN | 204100662 U | 1/2015 |
| CN | 204115391 U | 1/2015 |
| CN | 104329831 A | 2/2015 |
| CN | 104344595 A | 2/2015 |
| CN | 104374044 A | 2/2015 |
| CN | 104374055 A | 2/2015 |
| CN | 104374117 A | 2/2015 |
| CN | 104374159 A | 2/2015 |
| CN | 104374161 A | 2/2015 |
| CN | 104374162 A | 2/2015 |
| CN | 204141931 U | 2/2015 |
| CN | 204143491 U | 2/2015 |
| CN | 204177417 U | 2/2015 |
| CN | 204178470 U | 2/2015 |
| CN | 104406271 A | 3/2015 |
| CN | 104422065 A | 3/2015 |
| CN | 104422198 A | 3/2015 |
| CN | 104422217 A | 3/2015 |
| CN | 104456846 A | 3/2015 |
| CN | 104457048 A | 3/2015 |
| CN | 104457072 A | 3/2015 |
| CN | 104457130 A | 3/2015 |
| CN | 104457132 A | 3/2015 |

(56) References Cited

FOREIGN PATENT DOCUMENTS

| | | |
|---|---|---|
| CN | 104467148 A | 3/2015 |
| CN | 204187779 U | 3/2015 |
| CN | 204202120 U | 3/2015 |
| CN | 104482712 A | 4/2015 |
| CN | 104501483 A | 4/2015 |
| CN | 104503309 A | 4/2015 |
| CN | 104515245 A | 4/2015 |
| CN | 104534618 A | 4/2015 |
| CN | 204270404 U | 4/2015 |
| CN | 204291654 U | 4/2015 |
| CN | 105444510 A | 3/2016 |
| CN | 304444504 S | 1/2018 |
| CN | 210441529 U | 5/2020 |
| CN | 114517990 A | 5/2022 |
| DE | 10150819 A1 | 4/2003 |
| DE | 10161576 A1 | 6/2003 |
| DE | 69916310 | 5/2004 |
| DE | 202006010816 U1 | 2/2007 |
| DE | 202006020319 U1 | 7/2008 |
| DE | 60328750 | 9/2009 |
| DE | 202010009418 U1 | 11/2010 |
| DE | 602007009584 | 11/2010 |
| DE | 60336637 | 5/2011 |
| DE | 112017000915 T5 | 10/2018 |
| DE | 102017214941 A1 | 2/2019 |
| DE | 112017005541 T5 | 8/2019 |
| DE | 102019200063 A1 | 7/2020 |
| DE | 112018005002 T5 | 7/2020 |
| DE | 112020000798 T5 | 12/2021 |
| DK | 1413694 T3 | 11/2009 |
| DK | 1826041 T3 | 1/2011 |
| EP | 881443 A1 | 12/1998 |
| EP | 954083 A2 | 11/1999 |
| EP | 1304608 A1 | 4/2003 |
| EP | 1378981 A2 | 1/2004 |
| EP | 1127301 B1 | 4/2004 |
| EP | 1378981 A3 | 11/2006 |
| EP | 1826041 A1 | 8/2007 |
| EP | 1226394 B1 | 9/2007 |
| EP | 1879367 A1 | 1/2008 |
| EP | 2056534 A1 | 5/2009 |
| EP | 1478531 B1 | 4/2011 |
| EP | 2390601 A1 | 11/2011 |
| EP | 2769275 A4 | 4/2016 |
| EP | 2903859 B1 | 12/2017 |
| EP | 2462395 B1 | 1/2018 |
| EP | 3436752 A4 | 2/2020 |
| EP | 3910261 A4 | 11/2021 |
| EP | 3971661 A1 | 3/2022 |
| EP | 3971691 A1 | 3/2022 |
| EP | 3972314 A1 | 3/2022 |
| GB | 2399887 A | 9/2004 |
| JP | 2000357146 A | 12/2000 |
| JP | 2001183043 A | 7/2001 |
| JP | 2001208463 A | 8/2001 |
| JP | 2002092120 A | 3/2002 |
| JP | 2002092307 A | 3/2002 |
| JP | 2002162146 A | 6/2002 |
| JP | 2002228154 A | 8/2002 |
| JP | 2002236798 A | 8/2002 |
| JP | 2002295936 A | 10/2002 |
| JP | 2002295939 A | 10/2002 |
| JP | 2002295960 A | 10/2002 |
| JP | 2002295961 A | 10/2002 |
| JP | 2002342564 A | 11/2002 |
| JP | 2003022364 A | 1/2003 |
| JP | 2003090673 A | 3/2003 |
| JP | 2003162243 A | 6/2003 |
| JP | 2003207260 A | 7/2003 |
| JP | 2003242343 A | 8/2003 |
| JP | 2004005027 A | 1/2004 |
| JP | 2004086684 A | 3/2004 |
| JP | 2004259145 A | 9/2004 |
| JP | 2005098560 A | 4/2005 |
| JP | 2005101846 A | 4/2005 |
| JP | 2005164054 A | 6/2005 |
| JP | 2005284611 A | 10/2005 |
| JP | 2005293382 A | 10/2005 |
| JP | 2005311864 A | 11/2005 |
| JP | 2006011930 A | 1/2006 |
| JP | 2006250510 A | 9/2006 |
| JP | 2007046833 A | 2/2007 |
| JP | 2013238345 A | 11/2013 |
| JP | 2014209053 A | 11/2014 |
| JP | 2021007339 A * | 1/2021 |
| KR | 20000030798 A | 6/2000 |
| KR | 20000071913 A | 12/2000 |
| KR | 20010077246 A | 8/2001 |
| KR | 20010077303 A | 8/2001 |
| KR | 20010094360 A | 11/2001 |
| KR | 20010094428 A | 11/2001 |
| KR | 20010105113 A | 11/2001 |
| KR | 20020004925 A | 1/2002 |
| KR | 20020009140 A | 2/2002 |
| KR | 20020009141 A | 2/2002 |
| KR | 20020013125 A | 2/2002 |
| KR | 20020027722 A | 4/2002 |
| KR | 20020055514 A | 7/2002 |
| KR | 100373092 B1 | 2/2003 |
| KR | 100373093 B1 | 2/2003 |
| KR | 20030016739 A | 3/2003 |
| KR | 100379416 B1 | 4/2003 |
| KR | 100381168 B1 | 4/2003 |
| KR | 20030075692 A | 9/2003 |
| KR | 100400464 B1 | 10/2003 |
| KR | 100403021 B1 | 10/2003 |
| KR | 20040021305 A | 3/2004 |
| KR | 20040029884 A | 4/2004 |
| KR | 20040032649 A | 4/2004 |
| KR | 100429617 B1 | 5/2004 |
| KR | 100432721 B1 | 5/2004 |
| KR | 100437057 B1 | 6/2004 |
| KR | 100457558 B1 | 11/2004 |
| KR | 100457559 B1 | 11/2004 |
| KR | 100471448 B1 | 3/2005 |
| KR | 100476448 B1 | 3/2005 |
| KR | 100484814 B1 | 4/2005 |
| KR | 100487763 B1 | 5/2005 |
| KR | 20050054716 A | 6/2005 |
| KR | 20050058799 A | 6/2005 |
| KR | 20050059883 A | 6/2005 |
| KR | 20050077657 A | 8/2005 |
| KR | 20050078301 A | 8/2005 |
| KR | 20050110147 A | 11/2005 |
| KR | 100535675 B1 | 12/2005 |
| KR | 100565482 B1 | 3/2006 |
| KR | 100593641 B1 | 6/2006 |
| KR | 100600741 B1 | 7/2006 |
| KR | 20060089854 A | 8/2006 |
| KR | 20060117703 A | 11/2006 |
| KR | 20060119580 A | 11/2006 |
| KR | 20060120799 A | 11/2006 |
| KR | 100656394 B1 | 12/2006 |
| KR | 100656400 B1 | 12/2006 |
| KR | 100657926 B1 | 12/2006 |
| KR | 100657927 B1 | 12/2006 |
| KR | 100673435 B1 | 1/2007 |
| KR | 20070012991 A | 1/2007 |
| KR | 100676764 B1 | 2/2007 |
| KR | 20070027180 A | 3/2007 |
| KR | 20070053510 A | 5/2007 |
| KR | 20070074863 A | 7/2007 |
| KR | 100745804 B1 | 8/2007 |
| KR | 20080029408 A | 4/2008 |
| KR | 20080037129 A | 4/2008 |
| KR | 100832492 B1 | 5/2008 |
| KR | 20080060910 A | 7/2008 |
| KR | 20080076381 A | 8/2008 |
| KR | 20090045596 A | 5/2009 |
| KR | 20090047724 A | 5/2009 |
| KR | 100934001 B1 | 12/2009 |
| KR | 100950734 B1 | 3/2010 |
| KR | 100975938 B1 | 8/2010 |
| KR | 100982260 B1 | 9/2010 |

(56) References Cited

FOREIGN PATENT DOCUMENTS

| | | |
|---|---|---|
| KR | 101028075 B1 | 4/2011 |
| KR | 101028502 B1 | 4/2011 |
| KR | 101031844 B1 | 5/2011 |
| KR | 20110050764 A | 5/2011 |
| KR | 20110067824 A | 6/2011 |
| KR | 20110124082 A | 11/2011 |
| KR | 20130094047 A | 8/2013 |
| KR | 20140000081 A | 1/2014 |
| KR | 20140026975 A | 3/2014 |
| KR | 20150051514 A | 5/2015 |
| KR | 20150052690 A | 5/2015 |
| MX | 2007002196 A | 11/2008 |
| SE | 202073 L | 1/2004 |
| TW | 200301047 A | 6/2003 |
| TW | 593950 B | 6/2004 |
| TW | 201309059 A | 2/2013 |
| WO | 03072378 A8 | 5/2004 |
| WO | 2012122390 A2 | 9/2012 |
| WO | 2013189183 A1 | 12/2013 |
| WO | 2014014862 A2 | 1/2014 |
| WO | 2014016212 A1 | 1/2014 |
| WO | 2014106060 A1 | 7/2014 |
| WO | 2014183437 A1 | 11/2014 |
| WO | 2014205243 A1 | 12/2014 |
| WO | 2015058421 A1 | 4/2015 |
| WO | 2016000041 A1 | 1/2016 |
| WO | WO2016029525 A1 | 3/2016 |
| WO | 2018082168 A1 | 5/2018 |
| WO | 2018096127 A1 | 5/2018 |
| WO | 2019038023 A1 | 2/2019 |
| WO | 2019082168 A1 | 5/2019 |
| WO | 2020183367 A1 | 9/2020 |
| WO | 2020183368 A1 | 9/2020 |
| WO | 2022058390 A1 | 3/2022 |
| WO | 2022058391 A1 | 3/2022 |
| WO | WO2022058389 A1 | 3/2022 |
| WO | WO2022081206 A1 | 4/2022 |
| WO | WO2022081207 A1 | 4/2022 |
| WO | WO2022105851 A1 | 5/2022 |

OTHER PUBLICATIONS

Office Action for Germany Patent Application No. 102017214941.8 mailed on Nov. 2, 2023.
ISA/European Patent Office; International Search Report and Written Opinion for PCT/EP2021/075391 mailed Nov. 9, 2021.
"Understanding : On/Off, Floating, Modulating/Proportional Control", retreived from internet URL: https://controltrends.org/by-industry/commercial-hvac/03/understanding-on-off-floating-modulatingproportional-control/, on Jan. 23, 2019, p. 2, paragraph 3.
"Starting up the Truma iNet System," truma iNet System, pp. 1-8 (2015).
Ferrill, B., et al., "Swipe to Patent: Design Patents In The Age Of User Interfaces," Tech Crunch, retreived from internet URL: https://techcrunch.com/2015/08/03/swipe-to-patent-design-patents-in-the-age-of-user-interfaces/, on Dec. 12, 2018, p. 23.
International Search Report and Written Opinion for International Application No. PCT/IB2018/058414, mailed on Jan. 31, 2019.
U.S. Appl. No. 62/578,350, filed Oct. 27, 2017 entitled "Systems, Methods, and Apparatuses for Providing Communications Between Climate Control Devices in a Recreational Vehicle".
International Search Report and Written Opinion for International Application No. PCT/EP2018/070390, mailed on Sep. 21, 2018.
U.S. Appl. No. 16/172,253 entitled "Systems, Methods, and Apparatuses for Providing Communications Between Climate Control Devices in a Recreational Vehicle" filed Oct. 26, 2018.
U.S. Appl. No. 16/641,581 entitled "Recreational Vehicle, Cooling Device, Controlling System and Method for Controlling the Cooling Device" filed Feb. 24, 2020.
Non Final office Action for U.S. Appl. No. 16/172,253, Mailed on Feb. 12, 2020.

Office Action for Germany Patent Application No. 102017214941.8 mailed on Jan. 31, 2020.
Bochner, B., "Digitization in the Mobile Home—Mobile tour into the digital future," URL: https://www.promobil.de/zubehoer/mobil-tour-in-die-digi-zukunft-digitale-kofortzone.
Heinz, D.S., "Bus Technology in the Camper—promobil explains the complex electronics," URL: https://www.promobil.de/werkstatt/elektronik-im-wohnmobil-bus-technik-und-apps.
DE Application No. 112018005002.5 filed Apr. 24, 2020 entitled "Systems, Methods, and Apparatuses for Providing Communications Between Climate Control Devices in a Recreational Vehicle".
Non Final office Action for U.S. Appl. No. 16/172,253, mailed on May 20, 2020.
Notice of Allowance for U.S. Appl. No. 16/172,253 Mailed on Oct. 26, 2020.
European Patent Application No. 20197019.1 entitled "A Recreational Vehicle User Interface" filed on Sep. 18, 2020.
European Patent Application No. 20197022.5 entitled "System and Method for Controlling at least one Function of a Vehicle" filed on Sep. 18, 2020.
European Patent Application No. 20197023.3 entitled "Devices and Method for Controlling at least one Function of a Vehicle" filed on Sep. 18, 2020.
Extended European Search Report for European Patent Application No. 20197019.1 mailed on Mar. 9, 2021.
Extended European Search Report for European Patent Application No. 20197022.5 mailed on Mar. 4, 2021.
Extended European Search Report for European Patent Application No. 20197023.3 mailed on Feb. 16, 2021.
Design U.S. Appl. No. 29/641,674, filed Mar. 23, 2018 titled "Control Panel".
Design U.S. Appl. No. 29/767,088, filed Jan. 20, 2021 titled "Control Panel".
Design U.S. Appl. No. 29/683,099, filed Mar. 11, 2019 titled Controller.
European Design Application No. 008053383-0001-0003 filed on Jul. 24, 2020.
Non Final office Action Issued in U.S. Appl. No. 16/641,581, mailed on Jun. 18, 2021.
Notice of Allowance for U.S. Appl. No. 16/641,581 Mailed on Oct. 6, 2021.
International Search Report and Written Opinion Issued in PCT Application No. PCT/EP2021/075391 mailed on Nov. 9, 2021.
International Search Report Issued in PCT Application No. PCT/EP2021/075390 mailed on Dec. 20, 2021.
U.S. Appl. No. 17/673,080 titled "Recreational Vehicle, Cooling Device, Controlling System and Method for Controlling the Cooling Device" filed on Feb. 16, 2022.
PCT Application No. PCT/EP2022/056369 titled "Improved Use of Minibar Sensors" filed on Mar. 11, 2022.
Corrected Notice of Allowance Issued in U.S. Appl. No. 16/641,581 mailed on Jan. 14, 2022.
AU Application No. 2021343247 titled "A Recreational Vehicle User Interface" filed on Mar. 13, 2023.
U.S. Appl. No. 18/245,321 titled "System and Method for Controlling At Least One Function of a Recreational Vehicle" filed on Mar. 14, 2023.
U.S. Appl. No. 18/245,322 titled "Devices and Methods for Securing Communication Between a Sensor and a Device" filed on Mar. 14, 2023.
PCT Application No. PCT/EP2022/068965 titled "Minibar Communication" filed on Jul. 7, 2022.
International Search Report and Written Opinion issued in PCT Application No. PCT/EP2022/068965 mailed on Feb. 21, 2023.
PCT Application No. PCT/EP2022/068968 titled "Minibar Operation" filed on Jul. 7, 2022.
International Search Report and Written Opinion issued in PCT Application No. PCT/EP2022/068968 mailed on Feb. 20, 2023.
PCT Application No. PCT/EP2022/068970 titled "Initialisation of a Communication Device for a Minibar" filed on Jul. 7, 2022.
International Search Report and Written Opinion issued in PCT Application No. PCT/EP2022/068970 mailed on Feb. 1, 2023.

(56) References Cited

OTHER PUBLICATIONS

International Search Report and Written Opinion issued in PCT Application No. PCT/EP2022/056369 mailed on Nov. 9, 2022.
Office Action issued in EP Application No. 20197023.3 mailed on Oct. 24, 2023.
"STIIC—Smart Touch Integrated Intelligence Control," retreived from internet URL: https://citimarinestore.com/en/dometic-marine-air-conditioner-parts/4748-stiic-smart-touch-integrated-intelligence-control-263400309.html on Dec. 12, 2018, pp. 2.
International Preliminary Report on Patentability Issued in PCT Application No. PCT/EP2021/075389 mailed on Mar. 30, 2023.
International Preliminary Report on Patentability Issued in PCT Application No. PCT/EP2021/075390 mailed on Mar. 30, 2023.
International Preliminary Report on Patentability Issued in PCT Application No. PCT/EP2021/075391 mailed on Mar. 30, 2023.
Notice of Allowance issued in U.S. Appl. No. 17/673,080 mailed on Sep. 28, 2023.
Corrected Notice of Allowability issued in U.S. Appl. No. 17/673,080 mailed on Oct. 4, 2023.
Office Action issued in EP Application No. 20197019.1 mailed on Apr. 26, 2024.
Office Action issued in EP Application No. 20197022.5 mailed on Jan. 19, 2024.

\* cited by examiner

DEVICES AND METHODS FOR SECURING COMMUNICATION BETWEEN A SENSOR AND A DEVICE

CROSS REFERENCE TO RELATED APPLICATIONS

This 35 U.S.C. § 371 National Stage Patent application claims priority to and benefit of PCT Patent Application No. PCT/EP2021/075391, filed Sep. 15, 2021, which claims priority to and benefit of EP 20197023.3, filed Sep. 18, 2020, all of which is incorporated herewith.

TECHNICAL FIELD

The present disclosure relates to the field of communication between a sensor and a device. More specifically, the present disclosure relates to devices as well as methods for securing communication between a sensor and a device.

The sensor may advantageously, but not necessarily, be used in a Recreational Vehicle (RV) monitoring and control system, i.e. a system that may use sensor data as input in order to monitor and control function(s) of a Recreational Vehicle (RV).

BACKGROUND

A sensor is a device that measures, or detects, some type of input within its physical environment. The input may be any one of a great number of environmental phenomena and may be, for example, light, temperature, speed, distance, moisture and pressure. Generally, the sensor converts the detected, or measured, input to an electronic signal. The electronic signal may be converted into human-readable information at the sensor location or transmitted electronically over a network for reading or further processing at a distant location. By transmitting the detected or measured input to a distant location, the sensor data may be used by other devices for taking decisions and/or controlling functions based on the received sensor data.

With decreased costs for sensors, sensors are used more and more to receive information that otherwise would have been unknown. By using sensors, it may be possible for a user to view a certain type of sensor input and it may furthermore be possible to use the sensor input for subsequent decisions and/or actions. However, if the sensor input is not correct or if the sensor input is fraudulent, this may lead to damages. In such cases, subsequent decisions and/or actions may be controlled based on incorrect assumptions. For example, if a sensor input does not correspond to a real value of a measured parameter, an incorrect function may be controlled instead of the correct function. Alternatively, the correct function may be controlled, but in an incorrect way. Accordingly, incorrect subsequent decisions and/or actions may lead to unnecessary actions and/or damages. This may result in unduly high costs. Thus, in order to avoid such costs and to prevent damages on person and/or equipment, it is important that a sensor input data actually correspond to the value it is believed to represent.

SUMMARY

In order to achieve a way for securing communication between a sensor and a device, the inventors of the various embodiments have realized, after inventive and insightful reasoning, that it has to be possible to verify data that is transmitted between the sensor and the device. The inventors have realised that this may be achieved by using a key, which is shared between the sensor and the device. The key may be used to verify the data integrity of the sensor data transmitted from the sensor. The key may be, for example, an encryption key. By using the key, it may be ensured that sensor data received from a certain sensor actually correspond to data received from that particular sensor and that the value of the sensor data actually corresponds to the value it is believed to represent. Thus, it is ensured that the received information is the same information as was transmitted from the sensor and it is possible to confirm from which sensor the information was received.

In view of the above, it is therefore a general object of the aspects and embodiments described throughout this disclosure to provide a way of verifying data integrity of sensor data from a sensor.

This general object has been addressed by the appended independent claims. Advantageous embodiments are defined in the appended dependent claims.

According to a first aspect, there is provided a method, implemented by a sensor, for securing communication between the sensor and a device, which is separate and distinct from the sensor.

In one exemplary embodiment, the method comprises receiving, from a control device, an identifier of the sensor and a request for an address of the sensor and a key for the sensor. The identifier of the sensor is to be related to the address and the key for the sensor. The method further comprises generating, as a response to the received request, the key for the sensor. The generated key is to be used for verifying data integrity of sensor data transmitted from the sensor. Thereafter, the method comprises transmitting, to the control device, a message comprising the address of the sensor and the generated key for the sensor.

In some embodiments, the method further comprises transmitting sensor data to the device. The sensor data is transmitted with a sequence number and a checksum encrypted with the generated key for the sensor. The address of the sensor may be a Media Access Control address (MAC) address and the encrypted checksum may be a keyed-hash message authentication code (HMAC).

In some embodiments, the method further comprises storing the generated key for the sensor together with the received identifier of the sensor.

In some embodiments, the method further comprises receiving, from the control device, a message configuring the sensor to transmit sensor data periodically to the device.

In some embodiments, the address of the sensor and the key for the sensor are transmitted to the device using Near Field Communication (NFC).

In some embodiments, the sensor is used in a Recreational Vehicle (RV) monitoring and control system.

According to a second aspect, there is provided a method, implemented by a control device, for securing communication between a sensor and a device, which is separate and distinct from the sensor.

In one exemplary embodiment, the method comprises transmitting, to the sensor, an identifier of the sensor and a request for an address of the sensor and a key for the sensor. The identifier of the sensor is to be related to the address and the key for the sensor. The method further comprises receiving, from the sensor, a message comprising the address of the sensor and the generated key for the sensor.

In some embodiments, the method further comprises storing the received key for the sensor together with the received address and the identifier of the sensor.

In some embodiments, the method further comprises transmitting, to the sensor, a message configuring the sensor to transmit sensor data periodically to the device.

In some embodiments, the method further comprises receiving sensor data from the sensor. The sensor data is received with a sequence number and a checksum encrypted with the generated key for the sensor. The address of the sensor may be a MAC address and the encrypted checksum may be a HMAC.

In some embodiments, the address of the sensor and the key for the sensor are received from the sensor using NFC.

In some embodiments, the control device is used in a RV monitoring and control system.

In some embodiments, the method further comprises transmitting a whitelist message to the device, wherein the whitelist message comprises the identifier for the sensor together with the key for the sensor and the address of the sensor.

According to a third aspect, there is provided a sensor for securing communication between the sensor and a device. The device is separate and distinct from the sensor. The sensor implementing the method according to the first aspect.

In one exemplary embodiment, the sensor is configured to receive, from a control device, an identifier of the sensor and a request for an address of the sensor and a key for the sensor. The identifier of the sensor is to be related to the address and the key for the sensor. The sensor is further configured to generate, as a response to the received request, the key for the sensor. The key is to be used for verifying data integrity of sensor data transmitted from the sensor. The sensor is further configured to transmit, to the control device, a message comprising the address of the sensor and the generated key for the sensor.

In some embodiments, the sensor is further configured to transmit sensor data to the device. The sensor data is transmitted with a sequence number and a checksum encrypted with the generated key for the sensor. The address of the sensor may be a MAC address and the encrypted checksum may be a HMAC.

In some embodiments, the sensor is further configured to store the generated key for the sensor together with the received identifier of the sensor.

In some embodiments, the sensor is further configured to receive, from the control device, a message configuring the sensor to transmit sensor data periodically to the device.

In some embodiments, the address of the sensor and the key for the sensor are transmitted to the device using NFC.

In some embodiments, the sensor is used in a RV monitoring and control system.

According to a fourth aspect, there is provided a control device for securing communication between a sensor and a device. The device is separate and distinct from the sensor. The control device implementing the method according to the second aspect.

In one exemplary embodiment, the control device is configured to transmit, to the sensor, an identifier of the sensor and a request for an address of the sensor and a key for the sensor. The identifier of the sensor is to be related to the address and the key for the sensor. The control device is further configured to receive, from the sensor, a message comprising the address of the sensor and the generated key for the sensor.

In some embodiments, the control device is further configured to store the received key for the sensor together with the received address and the identifier of the sensor.

In some embodiments, the control device is further configured to transmit, to the sensor, a message configuring the sensor to transmit sensor data periodically to the device.

In some embodiments, the control device is further configured to receive sensor data from the sensor. The sensor data is received with a sequence number and a checksum encrypted with the generated key for the sensor. The address of the sensor may be a MAC address and the encrypted checksum may be a HMAC.

In some embodiments, the address of the sensor and the key for the sensor are received from the sensor using NFC.

In some embodiments, the control device is used in a RV monitoring and control system.

In some embodiments, the control device is further configured to transmit a whitelist message to the device. The whitelist message comprises the identifier for the sensor together with the key for the sensor and the address of the sensor.

According to a fifth aspect of the present disclosure, the object is achieved by a computer program comprising instructions, which when executed by a processor, causes the processor to perform actions according to any of the methods according to the first and the second aspects.

According to a sixth aspect of the present disclosure, the object is achieved by a carrier comprising the computer program of the fifth aspect, wherein the carrier is one of an electronic signal, an optical signal, an electromagnetic signal, a magnetic signal, an electric signal, a radio signal, a microwave signal, or a computer-readable storage medium.

Some of the above embodiments eliminate or at least reduce the problems discussed above. By generating a key, which is shared between the sensor and the device, it is possible to verify the integrity of data received from a sensor. It is possible ensure that the received sensor data actually is received from the sensor, from which it is believed to be received. Also, it is possible to ensure that the sensor data actually corresponds to the value it is believed to represent. Thus, devices and methods, which may ensure secure communication between sensors and devices, are provided herein.

BRIEF DESCRIPTION OF DRAWINGS

These and other aspects, features and advantages will be apparent and elucidated from the following description of various embodiments, reference being made to the accompanying drawings, in which.

DETAILED DESCRIPTION

The disclosed embodiments will now be described more fully hereinafter with reference to the accompanying drawings, in which certain embodiments are shown. The embodiments may be provided in many different forms and should not be construed as limited to those set forth herein; rather, these embodiments are provided by way of example so that this disclosure will be thorough and complete, and will fully convey the scope of the claims to those skilled in the art. Like numbers refer to like elements throughout.

The disclosure presented herein concerns methods and devices for securing communication between a sensor and a device. The device is separate and distinct from the sensor, i.e. the device is another device than the sensor and the device may be located at another location than the sensor. The device may be any type of device that may communicate with the sensor. Examples of such devices may be control devices and interacting hubs. The disclosure presented herein concerns a sensor and a method, implemented by the sensor, for securing communication between the sensor and a device. The disclosure presented herein further concerns a control device and a method, implemented by the control device, for securing communication between a sensor and a device.

Figure 1A:
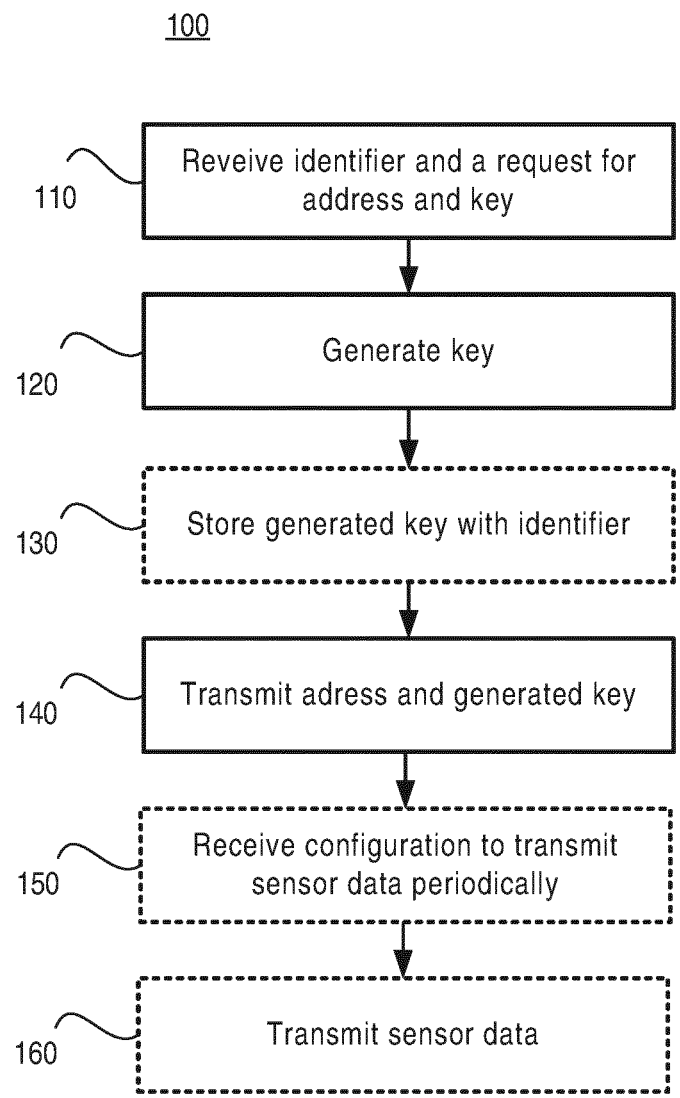
FIG. 1a shows a flowchart of an example method performed by a sensor.
Figure 1B:
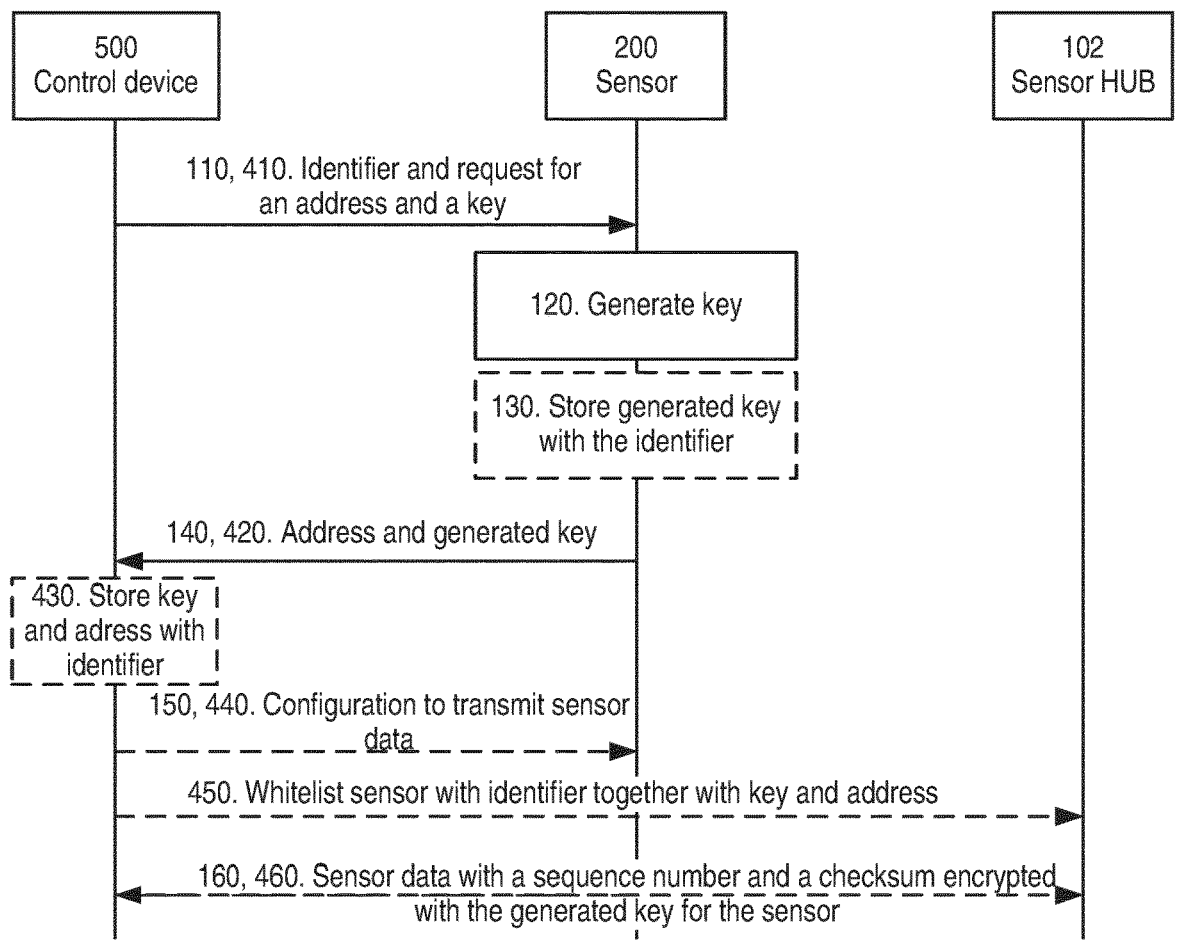
FIG. 1b is a signalling diagram according to an embodiment.

The present disclosure according to the aspect of the sensor 200 is now going to be described with reference to FIGS. 1a and 1b and FIG. 2. FIG. 1a shows a flowchart of an example method 100 performed by a sensor 200 and FIG. 1b is a signalling diagram according to the present disclosure. FIG. 2 is a schematic drawing illustrating the sensor 200 according to embodiments presented herein.

Figure 2A:
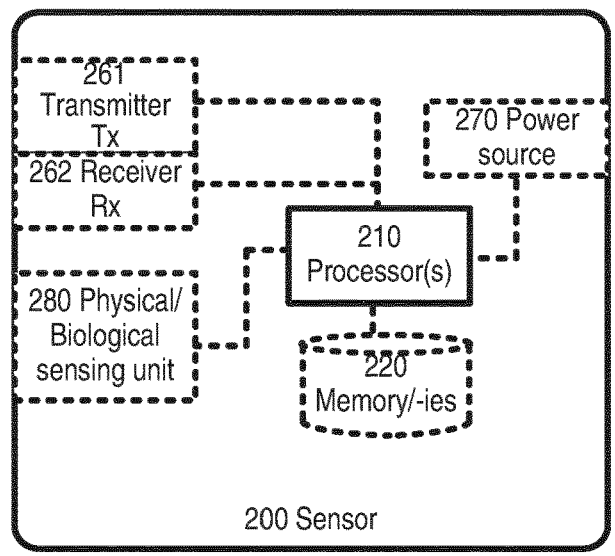
FIG. 2a is a schematic drawing illustrating a sensor according to embodiments herein.

The sensor 200 according to the present disclosure may be any type of sensor configured to measure and/or detect sensor input data. The sensor 200 is configured to perform the method 100 illustrated in FIG. 1a. As illustrated in FIG. 2a, the sensor 200 comprises at least one processor 210. The at least one processor 210 may be embodied as software, e.g. in a cloud-based solution, or the at least one processor 210 may be embodied as a hardware controller. It may be implemented using any suitable, publicly available processor. The at least one processor 210 may be implemented using instructions that enable hardware functionality, for example, by using executable computer program instructions in a general-purpose or special-purpose processor that may be stored on a computer readable storage medium (disk, memory etc.) to be executed by such a processor. The processor 210 may be configured to read instructions from a memory 220 and execute these instructions to secure communication between the sensor 200 and a device 102, 500. The memory 220 may be implemented using any commonly known technology for computer-readable memories such as ROM, RAM, SRAM, DRAM, FLASH, DDR, SDRAM or some other memory technology.

As illustrated in FIG. 2a, the sensor 200 may further comprise at least one transmitter 261 configured to transmit data and/or sensor data to a control device 500 and/or at least one device 102. The sensor 200 may further comprise at least one receiver 262 configured to receive data from the control device 500. The sensor 200 may further comprise a power source 270 such as a battery. The power source 270 may ensure that the processor 210 have enough power to perform the method 100 according to the present disclosure. The sensor 200 may further comprise at least one physical and/or biological sensing unit 280. This at least one unit 280 may be configured to sense, measure and/or detect the input, e.g. a physical parameter, within its physical environment. This input may thereafter be forwarded as sensor data 250.

As also illustrated in FIGS. 1a and 1b, the method 100 implemented by the sensor 200 begins with step 110 of receiving, from a control device 500, an identifier of the sensor 200 and a request for an address of the sensor 200 and a key for the sensor 200. The received identifier is an identifier given to the sensor 200 by the control device 500 and may be used to distinguish the sensor 200 from other sensors. The identifier may be a name given by the control device 500 and the identifier may thus, in some embodiments, be a given name. The identifier of the sensor 200 is to be related to the address of the sensor 200 and the key for the sensor 200. The address of the sensor 200 is unique and represents the sensor identity. The address may be, for example, a Media Access Control (MAC) address. The requested key for the sensor 200 may be an encryption key. The encryption key may be used to encrypt data with.

As a response to the received request, the method 100 continues with step 120 of generating the key for the sensor 200. The generated key is to be used for verifying data integrity of the sensor data transmitted from the sensor 200 and is to be shared between the sensor 200 and the device 102, 500 that is intended to receive data from the sensor 200. By verifying the data integrity of the sensor data, it may be ensured that the sensor data really is transmitted from the sensor 200 and it may be possible to know exactly from what sensor 200 the information has been received. Additionally, it may be ensured that the sensor data really corresponds to the data it is believed to represent. The key will ensure that information received from the sensor 200 is the same information that was transmitted from the sensor 200. Thus, the generated key is a unique key, which is associated with the specific sensor 200 and may only be used with sensor data received from that sensor 200.

Furthermore, the generated key may be used for sensor origin authentication. When sensor data is received from a sensor 200, it may be ensured that the received sensor data can be trusted. Sensor data originating from any sensor 200 that is configured according to the present disclosure may be verified by a receiving device 102, 500 as long as the device 102, 500 is in possession of the generated key. How this may be performed is described more in detail later.

In some embodiments, the sensor 200 may additionally store the generated key together with the identifier, illustrated as step 130 in FIGS. 1a and 1b. By storing the generated key together with the identifier, it may be known to the sensor 200 that the stored key is to be used with sensor data transmitted under the specific given identifier.

When the key for the sensor 200 has been generated, the method 100 continues with step 140 of transmitting, to the control device 500, the generated key for the sensor 200 in a message together with the address of the sensor 200. Thus, the control device 500 will receive the key, which may be used for verifying the correctness of the sensor data received from the sensor 200. Furthermore, as the given sensor identifier is associated with the generated key and the address of the sensor 200, the generated key is linked to the specific sensor 200 and the key may verify the correctness of the data and confirm the source of the data, i.e. that the sensor data really is transmitted from that specific sensor 200. Thus, it may be verified, based on the generated key, that sensor data received from sensor 200 really is the data it is believed to represent.

Accordingly, the present disclosure provides a method 100, implemented in a sensor 200, for securing communication between the sensor 200 and a device 102, 500. With the proposed method 100 and the proposed sensor 200, a unique key is shared between the sensor 200 and the control device 500 such that the correctness of the data received from the sensor 200 may be verified. As the sensor data transmitted from the sensor 200 may be used for subsequent actions or decisions, it is important that the used data really is the intended data. Otherwise, subsequent actions or decisions may be performed based on incorrect data and consequently based on incorrect assumptions. The sensor data may be used to control functions such as, for example, ventilation functions, heater functions, climate control functions, water heater functions, vehicle battery management functions, light control functions and security alarm functions. If any of these functions are controlled based on data that does not correspond to the real value of a parameter measured by the sensor 200, the function may be controlled in an incorrect way. For example, if a security alarm function is controlled based on incorrect data, the security alarm function may not be triggered. When that happens, there is a major risk that damages may occur. This may lead to unnecessary costs, which additionally may be high. Thus, the proposed method 100 and sensor 200 ensure secure communication between the sensor 200 and the device 102, 500.

There may be different ways of protecting the exchange of the sensor's key between the sensor 200 and the control device 500. According to one example embodiment, the key of the sensor 200 may be exchanged between the sensor 200 and the device 500 using Near Field Communication (NFC). NFC is a set of short-range wireless technologies, typically requiring a separation of 10 cm or less. Due to the short-range, it may be difficult for anyone to undetected eavesdrop and steal the key. It may be appreciated that while NFC may be used for sharing the key between the sensor 200 and the control device, sensor data transmitted from the sensor 200 may be transmitted from the sensor 200 using any available wireless technology. In some embodiments, all transfer of information is performed over a secure channel. The secure channel may be provided either by proximity through NFC as previously described, or over an encrypted channel such as, for example, Bluetooth Low Energy (BLE) Generic Attribute Profile (GATT).

Additionally, or alternatively, the sensor 200 may protect the key during the transmittal with a pin code. The pin code used for protecting the key may have been received from the control device 500 together with the received request for the key. Alternatively, the pin code used for protecting the key may have been agreed upon between the sensor 200 and the control device 500 at an earlier time.

After that the key has been shared between the sensor 200 and the device 500, the sensor 200 may receive, from the control device 500 in step 150, a message configuring the sensor 200 to transmit sensor data periodically to the device 500, 102. Accordingly, the sensor 200 may receive a message that configures the sensor 200 to transmit its sensor data with a certain interval. The sensor data comprises the input data that the sensor 200 has detected or measured within the physical environment. In some embodiments, the sensor data may be transmitted to be received by the control device 500, which configured the sensor 200. In other embodiments, the sensor data may be transmitted to be received by device 102, which may be another device than the control device 500. Accordingly, in these embodiments, the control device 500 may configure the sensor 200 to periodically transmit sensor data that may be received by another device 102. The interval at which the sensor 200 may be configured to transmit sensor data may depend on the type of sensor data received from the sensor 200. For example, some data may be valuable to receive often, with an interval of seconds, while other data may not be necessary to receive that often. This data may be enough to receive with an interval of minutes or even hours. However, in order to keep the power consumption of the sensor 200 at a reasonable level, advertising intervals not smaller than approximately 5 seconds may be preferred.

After the sensor 200 has generated and forwarded the key to the control device 500, the method 100 may further comprise step 160 of transmitting sensor data to the device 102, 500. In some embodiments, the sensor 200 may be unaware of which device 500, 102 the transmitted sensor data is intended to be transmitted to. In such embodiments, the sensor data may be broadcasted without an address to the intended recipient. In other embodiments, the sensor 200 may be aware of which device 500, 102 the sensor data is intended to be transmitted to and in these embodiments, the sensor data may be transmitted exclusively to that device 102, 500.

The generated key shared between the sensor 200 and the device 102, 500 may be used in different ways to verify the correctness of the sensor data. In one embodiment, the key may be used to encrypt at least a part of the sensor data before the sensor data is transmitted from the sensor 200 to the device 102, 500. The encrypted said at least a part of the sensor data may not necessarily be the data measured by the sensor 200, the encrypted sensor data may be a part of the data that may be used for verification of the transmitted data. Regardless of which part of the sensor data that is encrypted, the encrypted sensor data may only be decrypted by a device 102, 500 that has access to the corresponding key that the data has been encrypted with. Examples relating to how the generated key may be used to verify the correctness of the sensor data is going to be described with reference to FIG. 2b.

Figure 2B:
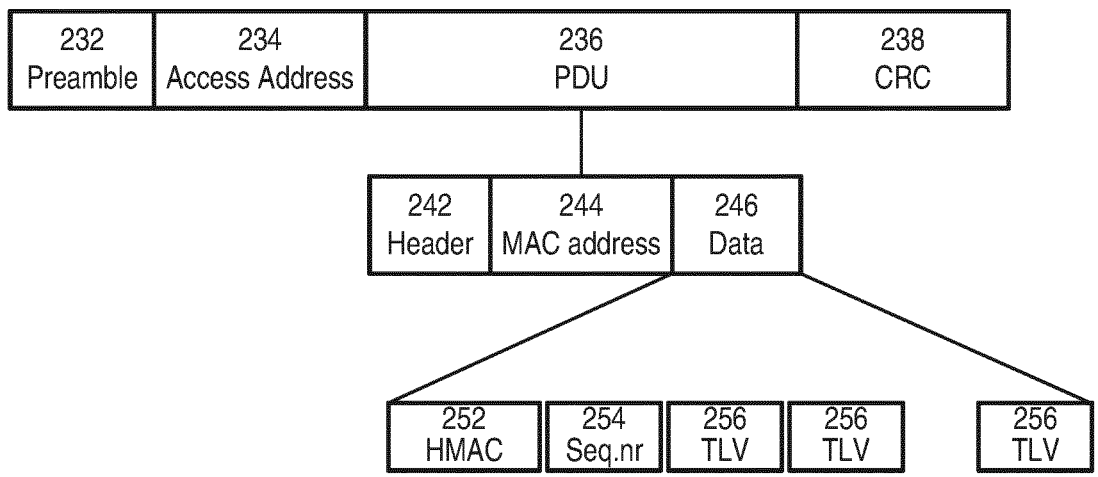
FIG. 2b shows an example of data transmitted from a sensor.

FIG. 2b illustrates an example of transmitted sensor data 250. As illustrated in FIG. 2b, the transmitted sensor data 250 may comprise a Protocol Data Unit (PDU) 236 of 2 to 39 bytes. A PDU is a single unit of information transmitted among peer entities of a computer network, here the sensor 200 and the device 102, 500. A PDU is composed of protocol-specific control information and user data. The PDU 236 may comprise a header 242 of 2 bytes, an address of 6 bytes and data 246 of 0 to 31 bytes. The data 246 of the sensor data 250 may comprise, in some embodiments as illustrated in FIG. 2b, a checksum 252. In some embodiments, the checksum may be encrypted with the generated and shared key for the sensor 200. As is known in the art, a checksum is a sum derived from a block of digital data for detecting errors that may have been introduced during the transmission of the data 250. Thus, by encrypting the checksum 252 with the generated shared key, only a device 102, 500 in possession of such key may be able to verify the data integrity of the sensor data 250. Unauthorized reproduction and use of the checksum 252 may accordingly be prevented. Furthermore, by using an encrypted checksum 252, only the checksum 252 may have to be encrypted with the exchanged key. Not the complete sensor data 250 may have to be encrypted. By encrypting the checksum 252, the identity of the sensor 200 transmitting the sensor data 250 may be protected. The encrypted checksum 252 may be, for example, a keyed-hash message authentication code (HMAC). In such embodiments, the address of the sensor 200 may be, for example, a MAC address.

In some embodiments, the sensor data 250 may further comprise a sequence number 254. The sequence number 254 comprised in the sensor data 250 may be a number that increases each time the sensor 200 transmits sensor data 250. By including a sequence number 254 for the sensor data 250, man-in-the-middle attacks may be prevented, or at least reduced. It may not be possible to record and replay previous transmitted data 250 from the sensor 200, as the sequence number 254 in such cases most likely will not correspond to the sequence number expected by the receiving device 102, 500. In some embodiments, the sequence number 254 may additionally be encrypted with the generated key for the sensor 200.

The data protected by the proposed method 100 is illustrated in FIG. 2b as TLV 256, wherein TLV stands for Type, Length and Value. The transmitted sensor data 250 may comprise one or more sets of data 256. What kind of data that is comprised within the at least one set of data 256 depends on the type of sensor 200. The data may comprise, for example temperature data, humidity data, barometric pressure data, light intensity data, air quality data, smoke detection data, gas level data, water level data, accelerometer data, passive IR data, proximity data, location data and virtual sensor data deducted from sensor data 250.

The proposed sensor 200 and method 100 may be used in any system, but according to one embodiment, the proposed sensor 200 and method 200 may be used with an actuator. An actuator is a component of a machine or device that is responsible for moving and controlling a mechanism or a system. The actuator may thus be responsible for controlling a function. Examples of such actuators may be, without limitation, an awning motor, a bilge pump, an RV levelling mechanism and an RV parking device. These actuators may take sensor data as input in order to control the particular function. Thus, the sensor data 250 is received from the sensor 200, which it is believed to be received from, and it is further important that the received sensor data 250 is the same data as was transmitted from the sensor 200, otherwise, there is a risk that the actuator may control the specific function in an incorrect way.

Figure 3:
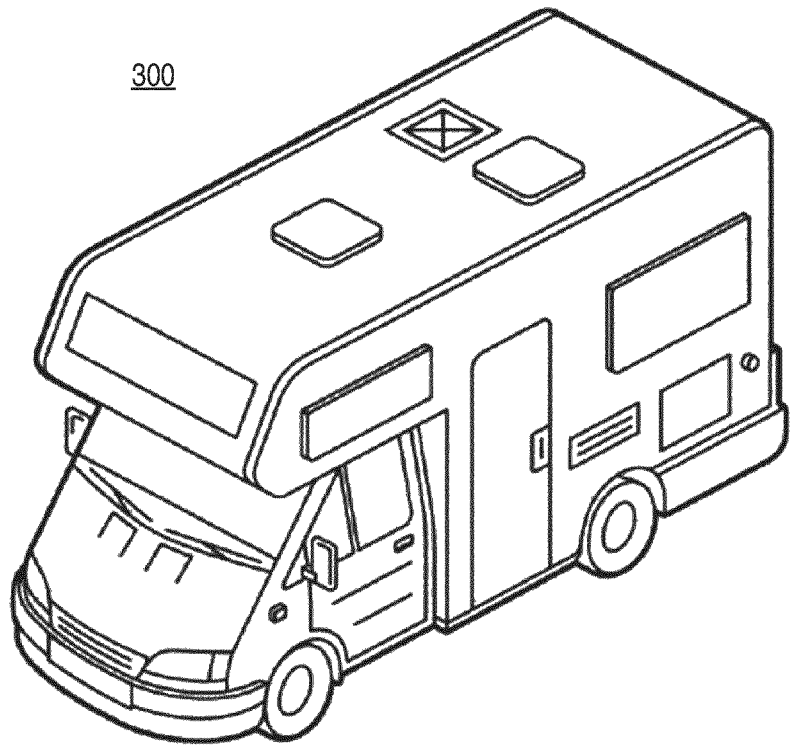
FIG. 3 shows an overview of a recreational vehicle.

As previously described, the proposed sensor 200 and method 100 may be used in any system, but according to one embodiment, the sensor 200 and the method 100 may be used in a Recreational Vehicle (RV) monitoring and control system. An RV monitoring and control system is a system that may use sensor data 250 as input in order to monitor and control a plurality of functions of a RV or a recreational vessel. A recreational vessel is a vehicle that is used in water and mainly for recreational purposes. An RV is a motor vehicle, or trailer, which may be used for recreation and which includes living quarters designed for accommodation. RVs include motorhomes, campervans, caravans—also known as travel trailers and camper trailers, fifth-wheel trailers, popup campers and truck campers. An overview of such an RV 300 is illustrated in FIG. 3.

As RVs 300 and recreational vessels may include many of the same functions as may be used in a house or an apartment, they may include a plurality of functions to be controlled by said RV monitoring and control system. These plurality of functions include functions such as HVAC (Heat, Ventilation and Air-Conditioning) related functions, security alarm functions, light control functions, etc. As the RV monitoring and control system may take sensor data 250 as input for controlling these functions, the functions are controlled by the correct input. It is important that received sensor data 250 corresponds to the value which it is believed to represent and is received from the particular sensor 200 from which it is believed to be received. Furthermore, as the RV monitoring and control system may receive a plurality of sensor data 250, directly from the sensor 200 or via an interacting hub, it is also important that the received sensor data 250 is not mixed up with any other sensor data. Accordingly, the RV monitoring and control system may be advantageous to use with the proposed sensor 200 and method 100.

Figure 4:
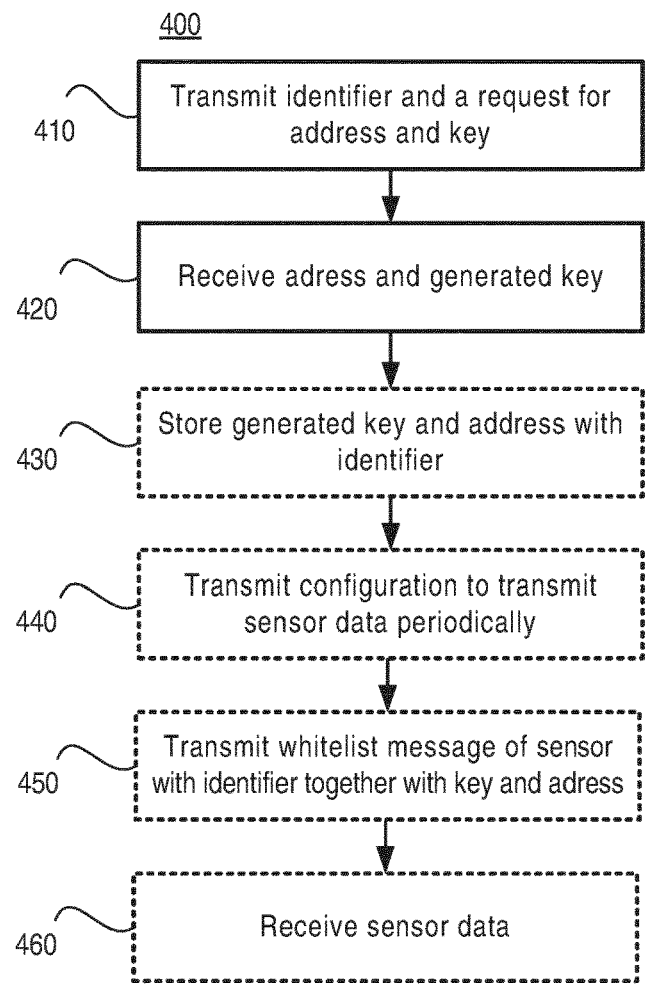
FIG. 4 shows a flowchart of an example method performed by a control device.
Figure 5:
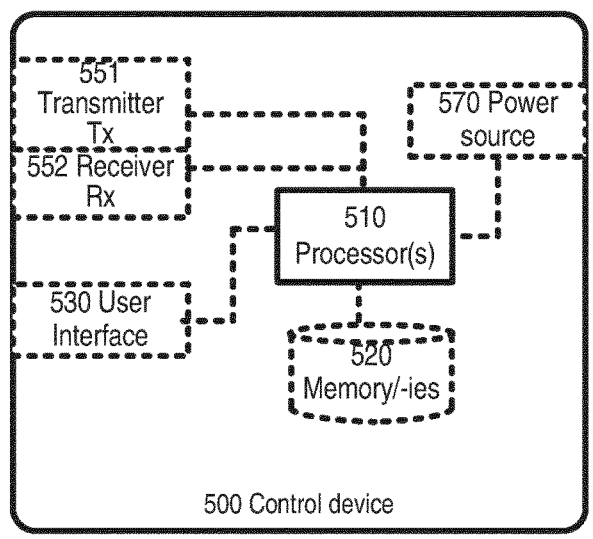
FIG. 5 is a schematic drawing illustrating a control device according to embodiments herein.

The present disclosure according to the aspect of the control device is now going to be described with reference to FIG. 1b, FIG. 4 and FIG. 5. FIG. 4 shows a flowchart of an example method 400 performed by the control device 500. FIG. 5 is a schematic drawing illustrating the control device 500 according to embodiments presented herein.

The control device 500 according to the present disclosure may be any type of device configured to communicate with a sensor 200 and configured to perform the method 400 illustrated in FIG. 4. The control device 500 is the device that begins and controls the sharing of the sensor key. The control device 500 may be e.g. a terminal such as a mobile phone or tablet, which may comprise an application, or app, used for the method 400. As illustrated in FIG. 5, the control device 500 may comprise a graphical user interface 530. The graphical user interface 530 may make it easier for a user to interact with the control device 500. Furthermore, the graphical user interface 530 may be used by a user using the control device 500 to monitor the disclosed method 400.

As illustrated in FIG. 5, the control device 500 comprises at least one processor 510. The at least one processor 510 may be embodied as software, e.g. in a cloud-based solution, or the at least one processor 510 may be embodied as a hardware controller. It may be implemented using any suitable, publicly available processor or Programmable Logic Circuit (PLC). The at least one processor 510 may be implemented using instructions that enable hardware functionality, for example, by using executable computer program instructions in a general-purpose or special-purpose processor that may be stored on a computer readable storage medium (disk, memory etc.) to be executed by such a processor. The processor 510 may be configured to read instructions from a memory 520 and execute these instructions to secure communication between the control device 500 and a sensor 200. The memory 520 may be implemented using any commonly known technology for computer-readable memories such as ROM, RAM, SRAM, DRAM, FLASH, DDR, SDRAM or some other memory technology.

The control device 500 may further comprise at least one transmitter 551 configured to transmit data to the sensor 200 and/or at least one device 102. The control device 500 may further comprise at least one receiver 552 configured to receive data from the sensor 200. The control device 500 may further comprise a power source 570 such as a battery. The power source 570 may ensure that the control device 500 may have enough power to perform the method 400.

As previously described, the methods 100 and 400 may be performed using NFC. NFC uses inductive coupling between two nearby loop antennas effectively forming an air-core transformer. The method 400 may thus begin when the control device 500 is placed on, or very close to, the sensor 200. In some embodiments, a user of the control device 500 may first choose and activate a sensor installation mode, e.g. the user may start the method 400 through an application of the control device 500 before the control device 500 is placed on, or close to, the sensor 200.

As also illustrated in FIGS. 1b and 4, the method 400 begins with step 410 of transmitting, to the sensor 200, an identifier of the sensor 200 and a request for an address of the sensor 200 and a key for the sensor 200. The identifier of the sensor 200 is to be related to the address and the key for the sensor 200. The identifier of the sensor 200 may have been chosen by a user of the control device 500 and may thus e.g. be a given name. The user may have named the sensor 200 through an application on the control device 500 and may thus have chosen the identifier to be any name suitable for the sensor 200. Alternatively, the control device 500 may have automatically named the sensor 200 based on available information regarding the sensor 200.

As a response to the transmitted request, the method 400 further continues with step 420 of receiving, from the sensor 200, a message comprising the requested address of the sensor 200 and the generated key for the sensor 200.

The control device 500 may further be configured to store the received key for the sensor 200 together with the received address and the identifier of the sensor 200, corresponding to step 430 of the method 400. By storing the key with the address and the identifier, it may be ensured that the correct key is used for the sensor data 250 received from the corresponding sensor 200. In some embodiments, the control device 500 may receive sensor data 250 from a plurality of sensors. In such case, the correct key is related to the correct sensor 200.

In some embodiments, the method 400 may further comprise step 440 of transmitting, to the sensor 200, a message configuring the sensor 200 to transmit sensor data 250 periodically to the device 500, 102. Thus, the control device 500 may transmit a configuration to the sensor 200, which configures the sensor 200 to transmit data with certain intervals. The interval by which the sensor 200 may be configured to transmit the sensor data 250 may be specified, for example, by a user via the control device 500. In other embodiments, the interval may be determined automatically by the control device 500 depending on the type of sensor 200 communicating with the control device 500. For example, it may be more valuable to receive sensor data relating to temperature more often than sensor data 250 relating to a water level. Thus, a sensor configured to measure temperature data may be configured to transmit sensor data more often than a water level sensor.

Once the control device 500 has received the key for a specific sensor 200, the method 400 may further comprise step 460 of receiving sensor data 250 from the sensor 200. As previously described, with reference to FIG. 2b, in some embodiments, the sensor data 250 may be received with a sequence number and a checksum encrypted with the generated key for the sensor 200. The address of the sensor may be a MAC address and the encrypted checksum may be a HMAC.

In case, the sensor data 250 is intended for another device 102 than the control device 500, the control device 500 may first have whitelisted the sensor 200 to that device 102. Thus, in some embodiments, the method 400 may further comprise step 450 of transmitting a whitelist message to the device 102. The whitelist message comprises the identifier for the sensor 200 together with the key for the sensor 200 and the address of the sensor 200. Thus, the control device 500 may be configured to communicate to other devices 102 that data received from the specified sensor 200 is approved and may be used for subsequent actions. By transmitting the given sensor name, the key, and the address of the sensor 200, the device 102 may receive the information needed for verifying the data integrity of the sensor data 250 received from the sensor 200. Accordingly, the device 102 may use the received key to verify the data integrity of data received from a sensor 200 matching the whitelisted given sensor name and address. The device 102 may then be configured to determine independently if the data is the expected data from the sensor 200. Thus, the control device 500 may distribute the key and the address of the sensor 200 to the devices 102 that are intended to receive data from the sensor 200. Accordingly, the sensor 200 does not have to exchange its key and address with other devices 102 than the control device 500. The sensor 200 may thus perform the so-called onboarding process once, with one device 500, but may still be possible to exchange data with several devices 102, 500. Furthermore, the control device 500 may keep control over which devices 102 that may be allowed to verify and thus use, the data received from the sensor 200. As previously described, the key may be exchanged using NFC in some embodiments. However, it may be appreciated that while NFC may be used during the onboarding process, the sensor data 250 may be transmitted using any available wireless technology.

The device 102, which may receive the whitelist message, may be any device, but in some embodiments, the device 102 may be an interacting hub, or a sensor hub. The interacting hub, or sensor hub, may be a device that verifies the integrity of the received sensor data 250 and then forwards it to other devices, which may use the sensor data 250. The interacting hub, or sensor hub, may be connected to several sensors 200 at the same time and may distribute, after the control device 500 has provided it with the sensor address, key and name, sensor data 250 between other devices.

The proposed control device 500 and method 400 may be used in any system, but according to one embodiment, the control device 500 and method 400 may be used in an RV monitoring and control system. As previously described, an RV monitoring and control system is a system that may take sensor data 250 as input for monitoring and controlling a plurality of functions of a RV 300 or a recreational vessel. As RVs and recreational vessels may include many functions which may be controlled by the RV monitoring and control system, the functions may be controlled based on the correct input. Further, received sensor data 250 may correspond to the value which it is believed to represent and the received sensor data 250 may be received from the particular sensor 200 from which it is believed to be received. Furthermore, the received sensor data 250 should not be mixed up with any other sensor data. Accordingly, the RV monitoring and control system may be advantageous to use with the proposed control device 500 and method 400.

Accordingly, the present disclosure provides methods and devices for securing communication between a sensor 200 and a device 102, 500. By providing a key, which may be used to verify data integrity of data received from the sensor 200, it may be assured that the data is the expected data and that the data really is received from the sensor 200.

In another aspect, the disclosure presented herein concerns a computer program comprising instructions, which when executed by a processor, causes the processor to perform actions according to any of the methods described with reference to FIGS. 1a and 1b and FIG. 4.

In another aspect, the disclosure presented herein concerns a carrier comprising the computer program of the previously described aspect, wherein the carrier is one of an electronic signal, an optical signal, an electromagnetic signal, a magnetic signal, an electric signal, a radio signal, a microwave signal, or a computer-readable storage medium.

Figure 6:
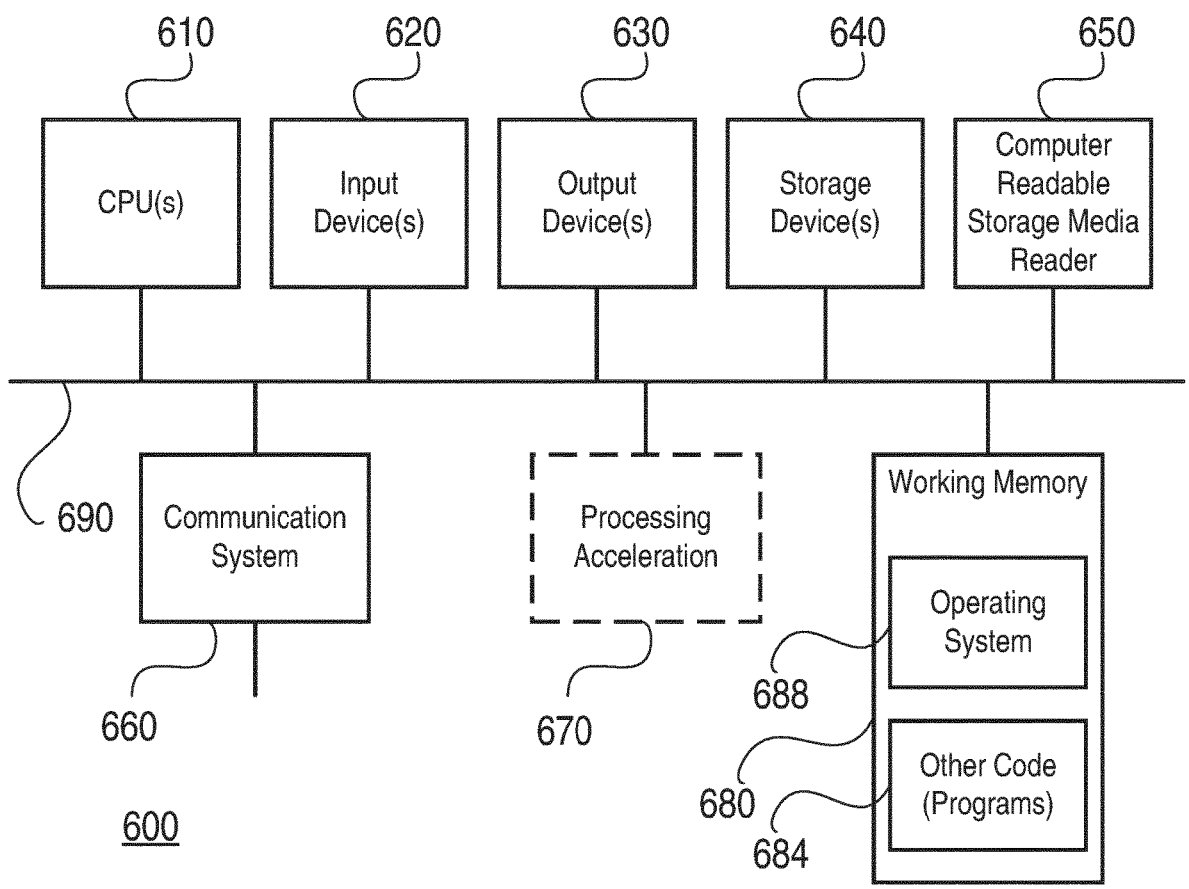
FIG. 6 shows a schematic view of a computer system.

FIG. 6 is a block diagram illustrating an exemplary computer system 600 in which embodiments of the present embodiments may be implemented. This example illustrates a computer system 600 such as may be used, in whole, in part, or with various modifications, to provide the functions of the disclosed devices 200, 500. For example, various functions may be controlled by the computer system 600, including, merely by way of example, transmitting a given sensor name and a request for an address and a key of the sensor 200 and receiving the requested address and key.

The computer system 600 is shown comprising hardware elements that may be electrically coupled via a bus 690. The hardware elements may include one or more central processing units 610, such as the at least one processor 510, one or more input devices 620 (e.g., a mouse, a keyboard, etc.), and one or more output devices 630 (e.g., a display device, a printer, etc.). The computer system 600 may also include one or more storage device 660. By way of example, the storage device(s) 660 may be disk drives, optical storage devices, solid-state storage device such as a random-access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infrared communication device, Bluetooth™ device, cellular communication device, etc.), and a working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with the storage device(s) 660) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within the working memory 680, including an operating system 688 and/or other code 686. It should be appreciated that alternative embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of the computer system 600 may include code 686 for implementing any or all of the function of the various elements of the architecture as described herein. For example, software, stored on and/or executed by a computer system such as the system 600, can provide the functions of the disclosed system. Methods implementable by software on some of these components have been discussed above in more detail.

The present disclosure provides methods, devices, computer programs and carriers for securing communication between a sensor 200 and a device 102, 500. By providing a key, which may be used to verify data integrity of data received from the sensor 200, it may be assured that the data is the expected data and that the data really is received from the sensor 200. The present disclosure may be advantageous to use together with RV monitoring and control systems.

References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

NUMBERED EXAMPLE EMBODIMENTS

The technology described throughout this disclosure thus encompasses without limitation the following numbered example embodiments:

NEE1. A method (100), implemented by a sensor (200), for securing communication between the sensor (200) and a device (102, 500) which is separate and distinct from the sensor (200), the method (100) comprising:
  receiving (110), from a control device (500), an identifier of the sensor (200) and a request for an address of the sensor (200) and a key for the sensor (200), wherein the identifier of the sensor (200) is to be related to the address and the key for the sensor (200);
  generating (120), as a response to the received request, the key for the sensor (200), wherein the generated key is to be used for verifying data integrity of sensor data (250) transmitted from the sensor (200); and
  transmitting (140), to the control device (500), a message comprising the address of the sensor (200) and the generated key for the sensor (200).

NEE2. The method (100) according to embodiment NEE1, wherein the method (100) further comprises:
  transmitting (160) sensor data (250) to the device (102, 500), wherein the sensor data (250) is transmitted with a sequence number and a checksum encrypted with the generated key for the sensor (200).

NEE3. The method (100) according to embodiment NEE2, wherein the address of the sensor (200) is a Media Access Control, MAC, address and the encrypted checksum is a keyed-hash message authentication code, HMAC.

NEE4. The method (100) according to any of embodiments NEE1 to NEE3, wherein the method (100) further comprises:
  storing (130) the generated key for the sensor (200) together with the received identifier of the sensor (200).

NEE5. The method (100) according to any of embodiments NEE1 to NEE4, wherein the method (100) further comprises:
  receiving (150), from the control device (500), a message configuring the sensor (200) to transmit sensor data (250) periodically to the device (102, 500).

NEE6. The method (100) according to any of embodiments NEE1 to NEE5, wherein the address of the sensor (200) and the key for the sensor (200) are transmitted to the device (102, 500) using Near Field Communication, NFC.

NEE7. A method (400), implemented by a control device (500), for securing communication between a sensor (200) and a device (102, 500) which is separate and distinct from the sensor (200), the method (200) comprising:
  transmitting (410), to the sensor (200) an identifier of the sensor (200) and a request for an address of the sensor (200) and a key for the sensor (200), wherein the identifier of the sensor (200) is to be related to the address and the key for the sensor (200); and
  receiving (420), from the sensor (200), a message comprising the address of the sensor (200) and the generated key for the sensor (200).

NEE8. A sensor (200) for securing communication between the sensor (200) and a device (102, 500), the sensor (200) being configured to:
  receive, from a control device (500), an identifier of the sensor (200) and a request for an address of the sensor (200) and a key for the sensor (200), wherein the identifier of the sensor (200) is to be related to the address and the key for the sensor (200);

generate, as a response to the received request, the key for the sensor (200), wherein the key is to be used for verifying data integrity of sensor data (250) transmitted from the sensor (200); and transmit, to the control device (500), a message comprising the address of the sensor (200) and the generated key for the sensor (200).

NEE9. The sensor (200) according to embodiment NEE8, wherein the sensor (200) further is configured to:

transmit sensor data (250) to the device (102, 500), wherein the sensor data (250) is transmitted with a sequence number and a checksum encrypted with the generated key for the sensor (200).

NEE10. The sensor (200) according to embodiment NEE9, wherein the address of the sensor (200) is a Media Access Control, MAC, address and the encrypted checksum is a keyed-hash message authentication code, HMAC.

NEE11. The sensor (200) according to any of embodiments NEE8 to NEE10, wherein the sensor (200) further is configured to:

store the generated key for the sensor (200) together with the received identifier of the sensor (200).

NEE12. The sensor (200) according to any of embodiments NEE8 to NEE11, wherein the sensor (200) further is configured to:

receive, from the control device (500), a message configuring the sensor (200) to transmit sensor data (250) periodically to the device (102, 500).

NEE13. The sensor (200) according to any of embodiments NEE8 to NEE12, wherein the address of the sensor (200) and the key for the sensor (200) are transmitted to the device (102, 500) using Near Field Communication, NFC.

NEE14. The sensor (200) according to any of embodiments NEE8 to NEE13, wherein the sensor (200) is used in a Recreational Vehicle, RV, monitoring and control system.

NEE15. A control device (500) for securing communication between a sensor (200) and a device (102, 500), the control device (500) being configured to:

transmit, to the sensor (200) an identifier of the sensor (200) and a request for an address of the sensor (200) and a key for the sensor (200), wherein the identifier of the sensor (200) is to be related to the address and the key for the sensor (200); and receive, from the sensor (200), a message comprising the address of the sensor (200) and the generated key for the sensor (200).

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

The invention claimed is:

1. A method, implemented by a control device, for securing communication between a sensor and a device which is separate and distinct from said sensor, the method comprising:

transmitting, to at least one processor of said sensor a name identifier of the sensor and a request for an address of the sensor and a generated key for the sensor, wherein the name identifier of the sensor is to be related to the address and the generated key for the sensor and the name identifier is chosen by a user through an application on the control device;

receiving, from the at least one processor of said sensor, a message comprising the address of the sensor and the generated key for the sensor; and, receiving, from the at least one processor of the sensor, sensor data, wherein the sensor data is transmitted with a sequence number and a checksum encrypted with the generated key for the sensor.

2. A control device for securing communication between a sensor and a device, the control device being configured to:

transmit, to at least one processor of the sensor a name identifier of the sensor and a request for an address of the sensor and a generated key for the sensor, wherein the name identifier of the sensor is to be related to the address and the generated key for the sensor and the name identifier is chosen by a user through an application on the control device; and receive, from the at least one processor of the sensor, a message comprising the address of the sensor and the generated key for the sensor; and, receive, from the at least one processor of the sensor, sensor data, wherein the sensor data is transmitted with a sequence number and a checksum encrypted with the generated key for the sensor.

3. A system comprising:

a control device, the control device being configured to:

transmit, to at least one processor of a sensor a name identifier of the sensor and a request for an address of the sensor and a generated key for the sensor, wherein the name identifier of the sensor is to be related to the address and the generated key for the sensor and the name identifier is chosen by a user through an application on the control device; and receive, from the at least one processor of the sensor, a message comprising the address of the sensor and the generated key for the sensor;

receive, from the at least one processor of the sensor, sensor data, wherein the sensor data is transmitted with a sequence number and a checksum encrypted with the generated key for the sensor;

the sensor for securing communication between the sensor and the control device, the at least one processor of the sensor being configured to:

receive, from the control device, an identifier of the sensor and a request for an address of the sensor and the generated key for the sensor, wherein the identifier of the sensor is associated with the address and the generated key for the sensor and is a name chosen by a user through an application on the control device;

generate, as a response to the received request, the generated key for the sensor, wherein the key is configured to be used for verifying data integrity of the sensor data transmitted from the sensor;

transmit, to the control device, a message comprising the address of the sensor and the generated key for the sensor; and, transmit, to the control device, the sensor data wherein the sensor data is transmitted with a sequence number and a checksum encrypted with the generated key for the sensor.

\* \* \* \* \*